(12) United States Patent
Sakai et al.

(10) Patent No.: US 8,076,035 B2
(45) Date of Patent: Dec. 13, 2011

(54) FUEL CELL WITH SEQUENTIAL ENZYMATIC REACTIONS

(75) Inventors: Hideki Sakai, Kanagawa (JP); Takashi Tomita, Kanagawa (JP); Ryosuke Takagi, Kanagawa (JP); Yusuke Suzuki, Kanagawa (JP); Tsuyonobu Hatazawa, Tokyo (JP)

(73) Assignee: Sony Corporation, Tokyo (JP)

( * ) Notice: Subject to any disclaimer, the term of this patent is extended or adjusted under 35 U.S.C. 154(b) by 1063 days.

(21) Appl. No.: 10/489,576

(22) PCT Filed: Jul. 25, 2003

(86) PCT No.: PCT/JP03/09480
§ 371 (c)(1),
(2), (4) Date: Apr. 1, 2004

(87) PCT Pub. No.: WO2004/012293
PCT Pub. Date: Feb. 5, 2004

(65) Prior Publication Data
US 2005/0053825 A1 Mar. 10, 2005

(30) Foreign Application Priority Data
Jul. 26, 2002 (JP) .............................. P2002-217802

(51) Int. Cl.
| H01M 8/16 | (2006.01) |
| H01M 8/22 | (2006.01) |
| C12M 1/00 | (2006.01) |
| C12N 9/00 | (2006.01) |
| C12N 11/00 | (2006.01) |
| C25B 9/00 | (2006.01) |
| C25B 11/00 | (2006.01) |
| C25B 13/00 | (2006.01) |
| C12Q 1/00 | (2006.01) |
| G01N 1/00 | (2006.01) |
| G01N 27/26 | (2006.01) |
| G01N 31/00 | (2006.01) |
| G01N 33/50 | (2006.01) |
| G01N 33/487 | (2006.01) |

(52) U.S. Cl. ..................... 429/401; 429/506; 204/403.1; 204/403.14; 435/283.1
(58) Field of Classification Search .................. 429/401, 429/506; 204/403.1, 403.14; 435/283.1
See application file for complete search history.

(56) References Cited

U.S. PATENT DOCUMENTS
4,490,464 A 12/1984 Gorton
6,270,649 B1 8/2001 Zeikus

FOREIGN PATENT DOCUMENTS
| JP | 57-96252 | 6/1982 |
| JP | 57-096252 | 6/1982 |
| JP | 2-253566 | 10/1990 |
| JP | 2000-133297 | 5/2000 |
| JP | 2000-133326 | 5/2000 |
| JP | 2002-520032 | 7/2002 |
| JP | 2003-13290 | 5/2003 |
| JP | 2003-132930 | 5/2003 |
| JP | 02-253566 | 10/2010 |
| WO | 00/03447 | 1/2000 |
| WO | 00/22688 | 4/2000 |

OTHER PUBLICATIONS

Kazuyoshi Takagi, Kenji Kailo, Tokuji Ikeda "Mediated bioelectrocatalysis based on NAD-related enzymes with reversible characteristics" Journal of Electroanalytical Chemistry 445 ( 998) 211-219.*
G. Tayhas R. Palmore, Hugo Bertschy, Steven H. Bergens, George M. Whitesides "A rnethanol/dioxygen biofuel cell that uses NAD+-dependent dehydrogenases as catalysts: application of an electro-enzymatic method to regenerate nicotinami~dea denine dinucleotide at low overpotentials" Journal of Electroanalytical Chemistry 343 (1998) 155-161.*
Takaaki Fujii et al. "Isozyme Patterns of Alchohol Dehydrogenase in a Methanol utilizing yeast *Candida* sp. N-16" Agric. Biol. Chem., 53 (3), 845-847, 1989.*
Sigma-Aldrich.com Product A9589, F1879, D5540, F8649. Accessed Aug. 29, 2007 4pgs.*
Walker et al. "Basic Protein and Peptide Protocols" Humana Press 1994, p. 304.*
Erickson et al. "Quality in Frozen Food" Chapman & Hall 1997, p. 214.*
www.answers.com Definition "Enzyme Assay" 5 pages accessed Jul. 2, 2008.*
Fujii, et al., "Isozyme Patterns of Alcohol Dehydrogenases in a Methanol-Utilizing Yeast", Agric. Biol. Chem., 53, pp. 845-847; 1989.
Takagi, et al., "Mediated Bioelectrocatalysis Based on NAD-related Enzymes with Reversible Characteristics", Journal of Electroanalytical Chemistry; 445, pp. 211-219, 1998.
Palmore, et al., "A Methanol/Dioxygen Biofuel Cell That Used NAD+-dependent Dehydrogenases as Catalysts: Application of an Electro-Engymatic Method to Regenerate Nicotinamide Adenine Dinucleotide at Low Overpotentials", Journal of Electroanalytical Chemistry; 443, pp. 55-161, 1998.
Japanese Office Action for corresponding JP2003-27945 issued on Mar. 30, 2010.
Japanese Office Action issued on Apr. 26, 2011 referencing JP 2003 279745.

\* cited by examiner

*Primary Examiner* — Jon P Weber
*Assistant Examiner* — Thane Underdahl
(74) *Attorney, Agent, or Firm* — K&L Gates LLP (57) ABSTRACT

A fuel cell which utilizes the biogenic metabolism to produce a high current density is provided. The fuel cell generates electric power in such a way that the fuel is decomposed stepwise by a plurality of enzymes and those electrons formed by oxidation are transferred to the electrode. The enzymes work such that the enzyme activity of the enzyme involved in decomposition in the early stage is smaller than the sum of the enzyme activities of the enzymes involved in decomposition in the later stage. In the case where a coenzyme is involved, the enzyme activity of the oxidase that oxidizes the coenzyme is greater than the sum of the enzyme activities of the enzymes involved in the formation of the reduced form of the coenzyme, out of the enzymes involved in the stepwise decomposition of the fuel.

7 Claims, 6 Drawing Sheets

FUEL CELL WITH SEQUENTIAL ENZYMATIC REACTIONS

CROSS REFERENCES TO RELATED APPLICATIONS

The present application claims priority to Japanese Patent Document No. P2002-217802 filed on Jul. 26, 2002, the disclosure of which is herein incorporated by reference.

BACKGROUND OF THE INVENTION

The present invention generally relates to a fuel cell. More specifically, the present invention relates to a fuel cell which utilizes biogenic metabolism.

The fuel cell basically includes a fuel electrode, an oxidizer electrode (or air electrode), and an electrolyte. The principle of its operation is based on the reverse action of the electrolysis of water. That is, the fuel cell receives hydrogen and oxygen and generates water ($H_2O$) and electricity. To be more specific, the fuel electrode is supplied with fuel (hydrogen). Upon oxidation, hydrogen separates into electrons and protons ($H^+$). These protons migrate to the air electrode through electrolyte. At the air electrode, protons react with oxygen supplied thereto, thereby generating water.

The fuel cell converts fuel's energy directly into electrical energy, thereby functioning as a highly efficient electric power generator. It can convert the energy of fossil fuels (such as natural gas, petroleum, and coal) into electric energy very efficiently anytime and anywhere.

Constant efforts have been directed to the research and development of fuel cells for large-scale electric power generation. Indeed, the fuel cell mounted on the space shuttle not only generated electric power but also supplied the crew with water. The fuel cell has proven itself to be a pollution-free electric power generator.

The recent noteworthy development is the fuel cell with a polymeric solid electrolyte which operates at comparatively low temperatures ranging from room temperature to about 90° C. This fuel cell is expected to find use not only as large-scale electric power generator but also as small-scale power source for automobiles and as portable power source for personal computers and mobile equipment.

Unfortunately, the above-mentioned fuel cell with a polymeric solid electrolyte still has problems to be solved despite its advantage of running at comparatively low temperatures. For example, it experiences catalyst poisoning with CO when it runs with methanol as fuel at around room temperature. It needs a catalyst of expensive noble metal such as platinum; it suffers energy loss due to crossover; and it encounters difficulties when it uses hydrogen as fuel.

With the foregoing in mind, there has been proposed an idea of applying biogenic metabolism to fuel cells by noting that biogenic metabolism taking place in an organism is a highly efficient energy conversion mechanism. The term "biogenic metabolism" as used herein embraces respiration, photosynthesis, and the like. Biogenic metabolism has the advantage of excelling in power generating efficiency and proceeding under mild conditions at room temperature.

Respiration is a mechanism consisting of the following steps. First, such nutrients as saccharides, fats, and proteins are incorporated into microorganisms and cells. They pass through the glycolytic and TCA cycles involving several enzymatic reactions. (TCA stands for tricarboxylic acid.) During their passage, they give rise to carbon dioxide ($CO_2$) and reduce nicotinamide adenine dinucleotide ($NAD^+$) into reduced nicotinamide adenine dinucleotide (NADH), thereby converting their chemical energy into oxidation reduction energy or electric energy. The electric energy of NADH is converted directly into electric energy of proton gradient in the electron transfer system. This step is accompanied by the reduction of oxygen that forms water. The thus obtained electric energy forms ATP from ADP with the aid of ATP synthetase. And, this ATP is used for reactions necessary for microorganisms and cells to grow. Such energy conversion takes place in cytosol and mitochondria.

Photosynthesis is a mechanism which consists of steps of taking up light energy and reducing nicotinamide adenine dinucleotide phosphate ($NADP^+$) into reduced nicotinamide adenine dinucleotide phosphoric acid (NADPH) through the electron transfer system, thereby generating electric energy. The result is oxidation of water to give oxygen. This electric energy is used to take up $CO_2$ for carbon fixation and to synthesize carbohydrates.

The biogenic metabolism involves the important NADH generating reaction which is represented by the formula (3) below.

$$\text{Fuel(reduced form)} + NAD^+ \leftrightarrow \text{Fuel(oxidized form)} + NADH + H^+ \quad (3)$$

(substrate) dehydrogenase (product)

So far, there are known hundreds of dehydrogenases. They play an important role as a catalyst that performs highly selective conversion of various substrates into products. Their selectivity stems from the fact that the enzyme consists of protein molecules and hence has a unique three-dimensional structure. It follows therefore that fuel taken into an organism sequentially undergoes reactions involving tens of dehydrogenases until it is oxidized to $CO_2$.

The technical idea of applying the biogenic metabolism to fuel cells has brought forth the microbial cell which takes out electric energy generated by microorganisms through an electron mediator and transfers electrons to the electrodes, thereby producing electric current. See, JP-A No. 2000-133297.

Unfortunately, microbes and cells have not only functions to convert chemical energy into electric energy but also other functions unnecessary for energy conversion. Therefore, the above-mentioned system causes electric energy to be consumed for undesirable reactions, thereby reducing the efficiency of energy conversion.

To cope with this situation, there has been proposed a fuel cell based on an idea of isolating the enzymes and electron mediator involved in reactions from microbes and cells and reconstructing an appropriate environment with them in which desired reactions alone take place. In practice, however, such a fuel cell merely produces a very low current density on account of the slow reaction rate of enzymes.

The present invention provides a fuel cell which uses the biogenic metabolism and yet produces a high current density.

SUMMARY OF THE INVENTION

The present invention in an embodiment is directed to a fuel cell which decomposes fuel with a plurality of enzymes in stepwise reactions and transfers electrons produced by oxidation reaction to the electrode, wherein reactions take place such that $U(E1) \leqq U(E2)$, where $U(E1)$ denotes the enzyme activity of enzyme-1 to produce decomposition product-1 through its decomposition reaction and $U(E2)$ denotes the sum of the enzyme activity of enzyme group-2 to decompose the decomposition product-1. The present invention provides a fuel cell which uses the biogenic metabolism and yet produces a high current density.

The complex enzymatic reactions to decompose fuel stepwise with a plurality of enzymes requires that intermediate products detrimental to enzyme activity should be decomposed immediately. According to an embodiment of the present invention, the enzyme activity of each enzyme is established such that the enzyme activity of a group of enzymes for decomposition in the subsequent stage is greater than the enzyme activity of enzyme-1 for decomposition in the preceding stage. The system achieves rapid fuel decomposition.

In the fuel cell defined above, the enzyme-1 is an oxidase in an embodiment.

In the fuel cell defined above, the decomposition reaction by the enzyme-1 is an oxidation reaction which transfers electrons to a coenzyme in an embodiment.

The fuel cell defined above further has a coenzyme oxidase to produce an oxidized form of the coenzyme such that $U(Co) \geq U(E)$, where $U(Co)$ denotes the enzyme activity of the coenzyme oxidase and $U(E)$ denotes the sum of the enzyme activities of a group of enzymes, out of the plurality of enzymes, involved in the production of reduced form of the coenzyme in an embodiment.

The fuel cell in which electrons are transferred to the coenzyme by oxidation reaction by the enzyme-1 is determined by the enzymatic reaction by the coenzyme oxidase when there is not enough coenzyme oxidase to oxidize rapidly the reduced form of the coenzyme. However, this is not the case for the fuel cell of the present invention in which the enzyme activity $U(Co)$ of the coenzyme oxidase to oxidize the coenzyme is greater than the sum $U(E)$ of the enzyme activities of a group of enzymes involved in oxidation of fuel (or production of reduced form of the coenzyme). In this system, the reduced form of the coenzyme is rapidly oxidized and the resulting electrons are transferred to the electrode through the electron mediator according to an embodiment.

A more specific description is given below for a fuel cell which uses methanol as a fuel. A fuel cell which uses methanol as a fuel includes of a fuel electrode, an air electrode, a proton conducting membrane placed between the fuel electrode and the air electrode, and an enzyme solution which transfers electrons to the fuel electrode. The enzyme solution contains alcohol dehydrogenase, formaldehyde dehydrogenase, formate dehydrogenase, diaphorase, electron mediator and the like. The alcohol dehydrogenase, formaldehyde dehydrogenase, formate dehydrogenase, and diaphorase have their enzyme activities which are denoted respectively by $U(ADH)$, $U(FalDH)$, $U(FateDH)$, and $U(DI)$.

It is assumed that the alcohol dehydrogenase is denoted by enzyme-1. The enzyme activity $U(ADH)$ corresponding to the enzyme activity $U(E1)$ of enzyme-1 should be such that $U(E1)=U(ADH) \leq U(E2)=U(FalDH)+U(FateDH)$, where $U(E2)=U(FalDH)+U(FateDH)$ is the sum of the enzyme activities of the enzymes (formaldehyde dehydrogenase and formate dehydrogenase) which decompose the decomposition product (formaldehyde). Then, it is assumed that the formaldehyde dehydrogenase is denoted by enzyme-1. The enzyme activity $U(FalDH)$ corresponding to the enzyme activity $U(E1)$ of enzyme-1 should be such that $U(E1)=U(FalDH) \leq U(E2)=U(FateDH)$, where $U(E2)=U(FateDH)$ is the sum of the enzyme activities of the enzymes (formate dehydrogenase) which decompose the decomposition product (formic acid). With these factors taken into consideration, the fuel cell which uses methanol as a fuel should preferably satisfy the formula (1) below in an embodiment:

$$0 < U(ADH) \leq U(FalDH) \leq U(FateDH) \quad (1)$$

In the above-mentioned fuel cell, the coenzyme oxidase is diaphorase and its enzyme activity $U(DI)$ corresponds to $U(Co)$, and the alcohol dehydrogenase, formaldehyde dehydrogenase, and formate dehydrogenase are all involved in production of the reduced form of the coenzyme. Therefore, the fuel cell should satisfy the formula (2) below in an embodiment:

$$U(ADH)+U(FalDH)+U(FateDH) \leq U(DI) \quad (2)$$

In the fuel cell constructed as mentioned above, the alcohol dehydrogenase, formaldehyde dehydrogenase, and formate dehydrogenase produce three molecules of NADH in total in the process of catalyzing the oxidation reaction from methanol (as fuel) to $CO_2$. In addition, the diaphorase transfers 2 electrons from the thus formed NADH to the fuel electrode through the electron mediator. The $H^+$ which is generated in these steps reaches the air electrode through the enzyme solution and the proton conducting membrane. At the air electrode, water is generated from $H^+$, oxygen ($O_2$), and electrons from the external circuit.

The enzyme solution is prepared so that the enzymes produce their maximum enzyme activities according to the sequence in which methanol is oxidized (or the enzymes in the order of alcohol dehydrogenase, formaldehyde dehydrogenase, and formate dehydrogenase). Therefore, the enzyme solution permits methanol to be decomposed smoothly and hence permits NADH to be formed rapidly.

Also, the enzyme solution is prepared such that the enzyme activity of diaphorase is greater than the sum of the enzyme activities of alcohol dehydrogenase, formaldehyde dehydrogenase, and formate dehydrogenase. Therefore, the enzyme solution permits electrons to be transferred rapidly from NADH to the fuel electrode without diaphorase becoming saturated.

The above-mentioned fuel cell of the present invention is characterized in that electrons are transferred from the coenzyme to the electron mediator. This fuel cell is further characterized in that the electron mediator is vitamin $K_3$ in an embodiment.

The fuel cell just mentioned above includes a fuel electrode, an air electrode, a proton conducting membrane held between the fuel electrode and the air electrode, and an enzyme solution which permits electrons to be transferred to the fuel electrode, if it is designed to run with methanol as a fuel. The enzyme solution contains alcohol dehydrogenase, formaldehyde dehydrogenase, formate dehydrogenase, diaphorase, and electron mediator, and the electron mediator is vitamin $K_3$.

Vitamin $K_3$ has an equilibrium redox potential similar to that of the coenzyme oxidase (e.g., diaphorase) which oxidizes the coenzyme. It smoothly transfers electrons to diaphorase and hence it functions as an electron mediator for fast electron transfer.

As mentioned above, the fuel cell of the present invention involves various kinds of enzymes having activities adjusted such that the reaction to decompose fuel proceeds smoothly and various kinds of coenzyme (e.g., NADH) having activities adjusted such that electrons are transferred to the fuel cell electrode smoothly. In addition, the fuel cell of the present invention employs vitamin $K_3$ (which functions as an electron mediator compatible with the dehydrogenase, e.g., DI) so that electron transfer takes place rapidly. Thus the fuel cell of the present invention brings about rapid reactions and produces a high current density.

Additional features and advantages of the present invention are described in, and will be apparent from, the following Detailed Description of the Invention and the figures.

DETAILED DESCRIPTION OF THE INVENTION

The present invention relates to a fuel cell. More specifically, the present invention relates to a fuel cell which utilizes biogenic metabolism. In what follows, the fuel cell of the present invention will be described in more detail with reference to the accompanying drawings according to an embodiment.

Figure 1:
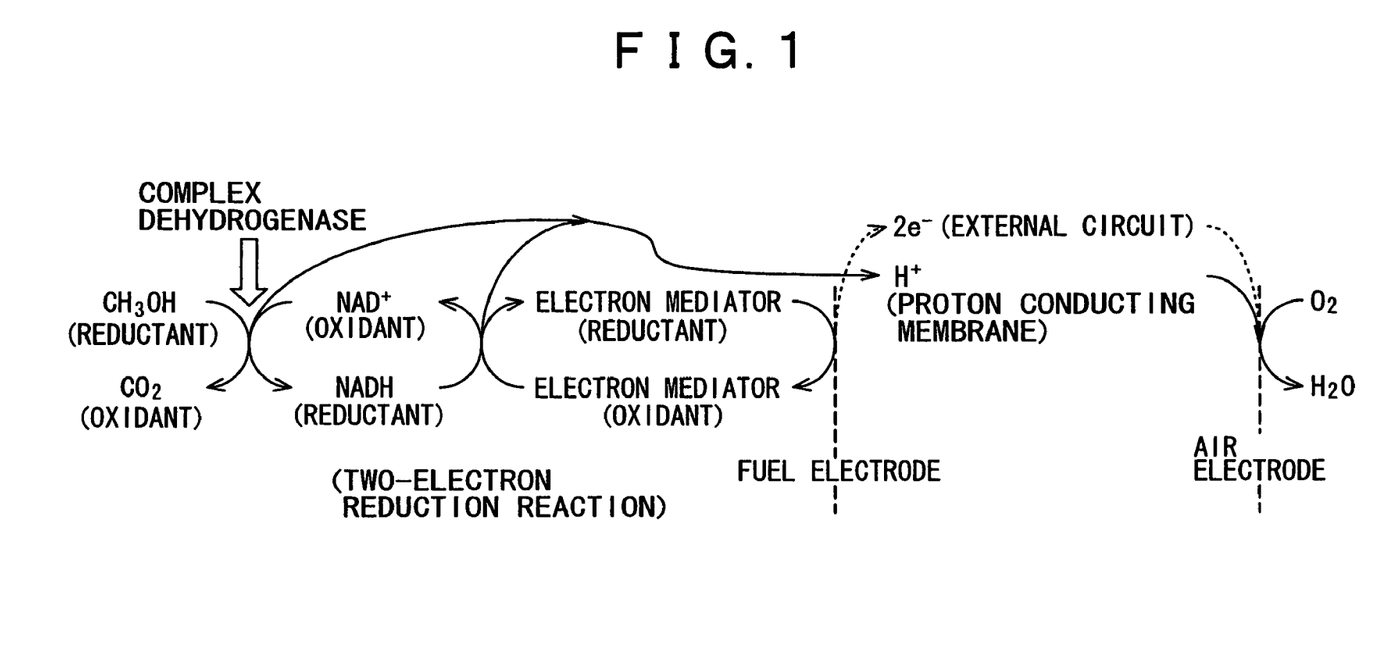
FIG. 1 is a schematic diagram to outline the reaction involved in the fuel cell according to an embodiment of the present invention.

The fuel cell of the present invention is one which utilizes the biogenic metabolism in an embodiment. As shown in FIG. 1, it includes a fuel electrode, an air electrode, a proton conductor to separate the fuel electrode and the air electrode from each other, and an enzyme solution containing enzymes, coenzyme, and electron mediator dissolved therein. The enzyme solution is held in a fuel electrode chamber to ensure its contact with the fuel cell. The enzyme solution in the fuel cell chamber is continuously supplied with fuel.

In the fuel cell constructed as mentioned above, the enzyme solution contains a complex dehydrogenase (including more than one kind of $NAD^+$-dependent dehydrogenase) which oxidizes fuel (say, methanol) into $CO_2$ through several steps, while generating NADH from coenzyme $NAD^+$. The thus generated NADH transfers 2 electrons to the fuel electrode through the electron mediator with the aid of diaphorase. Current occurs as electrons reach the air electrode through the external circuit. The protons ($H^+$) generated by the above-mentioned process migrate to the air electrode through the enzyme solution with or without proton conducting membrane. The air electrode generates water from the protons ($H^+$), 2 electrons supplied from the external circuit, and oxygen.

According to an embodiment of the present invention, a proper measure is taken to optimize the enzymatic activity of the enzyme (such as $NAD^+$-dependent dehydrogenase) and/or to select an optimal electron mediator, thereby increasing the rate of migration of electrons to the fuel electrode and also increasing the current density. A detailed description is given below, with reference to FIG. 2, of the reaction (shown in FIG. 1) to transfer electrons from the enzyme solution to the fuel electrode.

Figure 2:
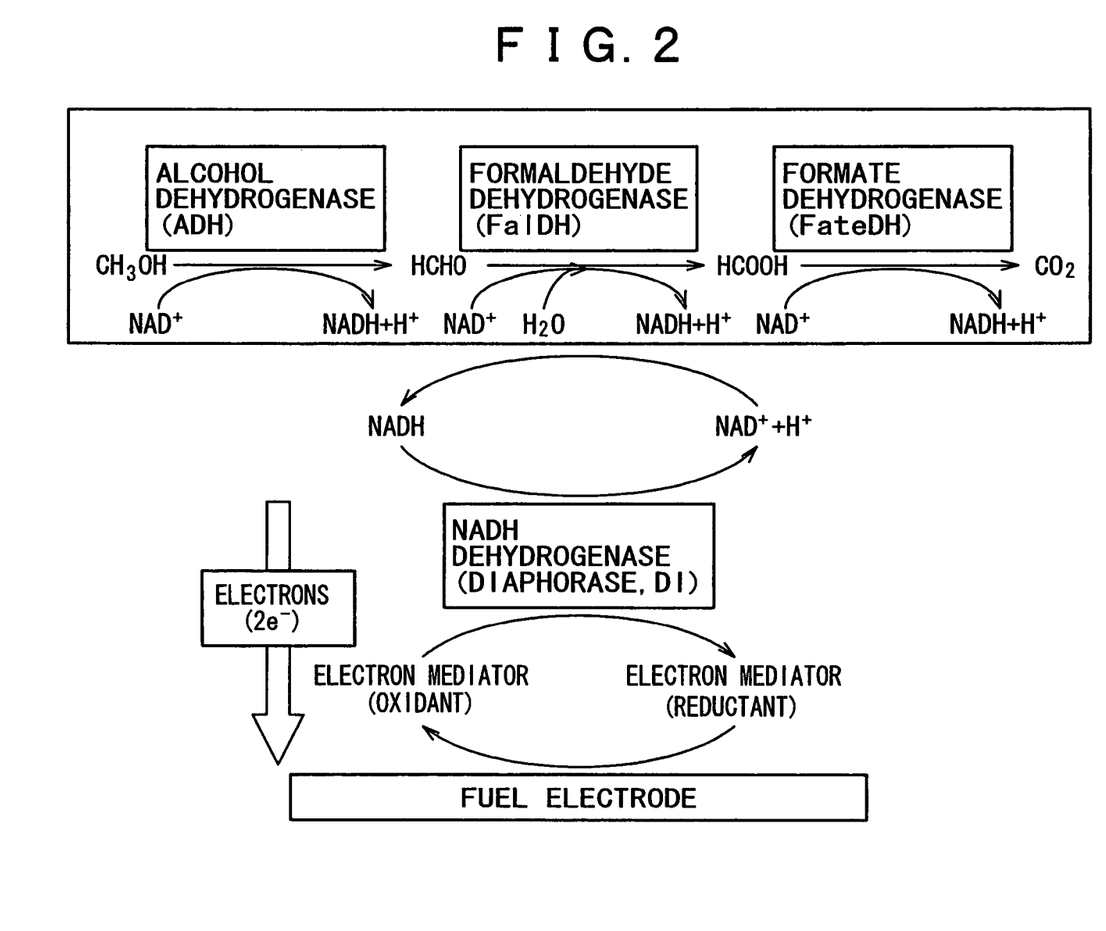
FIG. 2 is a schematic diagram to outline the reaction that takes place in the fuel electrode shown in FIG. 1 according to an embodiment of the present invention.

The enzyme solution contains the following three enzymes dissolved therein.

Alcohol dehydrogenase (ADH for short hereinafter), which produces formaldehyde and NADH from methanol.

Formaldehyde dehydrogenase (FalDH for short hereinafter), which produces formic acid and NADH from formaldehyde.

Formate dehydrogenase (FateDH for short hereinafter), which produces $CO_2$ and NADH from formic acid.

The enzyme solution also contains NADH dehydrogenase or diaphorase (DI for short hereinafter) dissolved therein, which oxidizes and decomposes NADH into $NAD^+$ and $H^+$. Moreover, the enzyme solution contains an electron mediator dissolved therein, which receives 2 electrons from NADH through DI and transfers them to the fuel electrode. Further, the enzyme solution contains the coenzyme $NAD^+$ dissolved therein, which is necessary for the $NAD^+$-dependent dehydrogenase to participate in reaction in an embodiment.

In the course of fuel decomposition, the enzymes in the enzyme solution should exhibit their enzyme activities that meet the following conditions. It is assumed that enzyme-1 denotes the alcohol dehydrogenase. Then, U(ADH) corresponding to the enzyme activity U(E1) of enzyme-1 should be such that $U(E1)=U(ADH) \leq U(E2)=U(FalDH)+U(FateDH)$, where U(E2) represents the sum of the enzyme activities of the enzymes (formaldehyde dehydrogenase and formate dehydrogenase) that decompose the decomposition product (formaldehyde). Alternatively, it is assumed that enzyme-1 denotes the formaldehyde dehydrogenase. Then, U(FalDH) corresponding to the enzyme activity U(E1) of enzyme-1 should be such that $U(E1)=U(FalDH) \leq U(E2)=U(FateDH)$, where U(E2) represents the sum of the enzyme activities of the enzymes (formate dehydrogenase) that decompose the decomposition product (formic acid). With this taken into account, the fuel cell which consumes methanol as fuel should satisfy the following equation (1) in an embodiment:

$$0 < U(ADH) \leq U(FalDH) \leq U(FateDH) \quad (1)$$

According to an embodiment of the present invention, three kinds of optimal $NAD^+$-dependent dehydrogenases are selected and they are used in such a way that their enzyme activity sequentially increases as the decomposition of methanol proceeds. This arrangement permits fast decomposition of methanol into $CO_2$ without accumulation of intermediate products (such as formaldehyde and formic acid), thereby producing NADH at a sufficiently high rate.

In addition, according to an embodiment of the present invention, it is necessary that the enzyme activity of DI involved in transfer of electrons from NADH to the fuel electrode should be greater than the sum of the enzyme activities of the three kinds of $NAD^+$-dependent dehydrogenases involved in production of NADH. The arrangement accelerates the rate of migration of electrons from the thus produced NADH to the fuel electrode. This is represented by the following equation (2) in which the enzyme activity of DI is denoted by U(DI) according to an embodiment:

$$U(ADH)+U(FalDH)+U(FateDH) \leq U(DI) \quad (2)$$

If the enzyme activity of DI is smaller than the sum of the enzyme activities of $NAD^+$-dependent dehydrogenase, the enzymatic reaction of DI restricts the entire rate of reaction, resulting in slow migration of electrons and low current density.

Incidentally, the term U (unit) used herein is an index to represent the enzyme activity which is the rate of reaction for about 1 μmol of substrate per minute at a certain temperature and pH.

The voltage of the fuel cell is established by controlling the redox potential of the electron mediator used for each electrode. In other words, if a higher voltage is desirable, an electron mediator with a more negative potential should be used for the fuel electrode and an electron mediator with a more positive potential should be used for the air electrode. Selection of an electron mediator should be made by taking into account affinity to enzymes, rate of exchange of electrons between it and electrode, and stability to inhibiting factors (such as light and oxygen).

It is desirable from the overall point of view that the electron mediator that acts on the fuel electrode should be vitamin $K_3$ (2-methyl-1,4-naphthoquinone, VK3 for short hereinafter). VK3 has a redox potential of −210 mV (in a solution at pH 7.0), which is slightly more positive than that of DI (about −380 mV (vs Ag/AgCl) in a solution at 7.0). DI has flavin mononucleotide (FMN for short hereinafter) as the active site. This leads to an adequate rate of exchange of electrons between DI and electron mediator, which in turn leads to a large current density. When combined with an air electrode, the resulting fuel cell produces a comparatively large voltage.

If the electron mediator is 1,4-benzoquinone (+93 mV (vs Ag/AgCl) which has a more positive potential than VK3, the dispersion of its molecules into the solution produces a significant effect, without as much change in current density as expected. Moreover, it reduces the voltage of the fuel cell. Alternatively, if the electron mediator is anthraquinone-2-sulfonate (−549 mV (vs Ag/AgCl) which has a more negative potential than VK3 and a slightly more positive potential than DI, the current density decreases but the voltage of the fuel cell increases. In this case, it is possible to increase the current density to some extent if the electrode is so constructed as to give a large area for reaction. Thus, VK3 may be replaced by any electron mediator having an adequate redox potential. Examples of such electron mediators that act on the fuel electrode include compounds having the quinone skeleton, metal complexes of Os, Ru, Fe, Co, etc., viologen compounds such as benzylviologen, compounds having nicotinamide structure, compounds having riboflavin structure, and compounds having nucleotide structure.

Examples of the electron mediator that acts on the air electrode include ABTS [2,2'-azobis(3-ethylbenzothiazoline-6-sulfonate)] metal complexes of Os, Ru, Fe, Co, and the like.

In this system, electric power is generated in the following manner. First, the enzyme solution is supplied with methanol as fuel. Then, ADH in the enzyme solution catalyzes oxidation of methanol to form formaldehyde. This reaction removes 2 $H^+$ and 2 electrons from methanol and forms NADH (reduced form of $NAD^+$) and $H^+$.

Next, FalDH adds $H_2O$ to the formaldehyde and removes 2 $H^+$ and 2 electrons to form formic acid. This reaction gives rise to NADH and $H^+$.

After that, FateDH removes 2 $H^+$ and 2 electrons from the formic acid to form $CO_2$ as the final product. This reaction gives rise to NADH and $H^+$. $CO_2$ as the final product (usually in the form of gas) is removed from the enzyme solution. Consequently, $CO_2$ does not appreciably change the pH of the enzyme solution, and the enzyme solution retains its enzyme activity.

Finally, DI oxidizes the NADH formed by the above-mentioned process and transfers electrons to the oxidized form of the electron mediator and changes the oxidized form of the electron mediator into the reduced form of the electron mediator. In the case where the electron mediator is VK3, the oxidized form of VK3 receives 2 electrons and 2 $H^+$ to become the oxidized form of VK3. The reduced form of the electron mediator transfers electrons to the fuel electrode and returns to the oxidized form of the electron mediator. The NADH which has been oxidized by DI becomes $NAD^+$ and $H^+$, and the resulting $NAD^+$ is reused while methanol is being decomposed by the $NAD^+$-dependent dehydrogenase. The result is that 2 electrons are transferred to the fuel electrode from one molecule of NADH and direct current is produced.

As mentioned above, in the step in which three kinds of $NAD^+$-dependent dehydrogenases decompose one molecule of methanol into $CO_2$, three molecules in total of NADH are produced. In this stage, $H^+$ is extracted from $H^+$-possessing fuels differing in energy state, and this process converts the chemical energy into the same substance (NADH). Using the chemical energy possessed by the NADH or by transferring electrons possessed by the NADH to the fuel electrode leads to the fuel cell having a high energy conversion rate.

For smooth transfer of electrons from NADH to the fuel electrode, it is desirable that sufficient electron mediators be present in the enzyme solution for the enzyme activity of DI.

For the above-mentioned enzymes to react steadily and efficiently, the enzyme solution should preferably be kept at approximately pH 7 by means of tris buffer or phosphate buffer. Also, the enzyme solution should preferably be kept at about 40° C. by a thermostat. The ion strength (I.S. for short hereinafter) should preferably be about 0.3 in consideration of the electrochemical response. It adversely affects the enzyme activity if it is excessively strong or weak. The above-mentioned pH, temperature, and ion strength will vary with individual enzymes.

The above-mentioned enzymes, coenzymes, and electron mediators may be used in the form of enzyme solution containing them. However, at least one of them may be immobilized on or near the electrode in the same way as employed in the field of biosensor. The fuel electrode may be prepared from active carbon or the like (which has a large surface area) in three-dimensionally packed form, so that it has a large area for reaction with the electron mediator. This is effective in increasing the current density further. Moreover, the enzyme may be densely immobilized on the electrode surface by crosslinking with glutaraldehyde, so that electrons are smoothly transferred from the enzyme to the electron mediator near the electrode surface. This helps increase the current density.

Incidentally, the enzymes used in the present invention are not restricted to those mentioned above and any other enzymes may be used. The above-mentioned ADH, FalDH, FateDH, and DI may be those which are made comparatively stable to pH and inhibitor by mutation. The enzyme for the air electrode may also be any known one such as laccase or bilirubinoxidase.

The fuel used for the fuel cell of the present invention includes, in addition to methanol, alcohol (such as ethanol), saccharides (such as glucose), fats, proteins, and organic acids as intermediate products resulting from glucose metabolism (such as glucose 6-phosphate, fructose 6-phosphate, fructose 1,6-bisphosphate, triose phosphate isomerase, 1,3-bisphosphoglyceride, 3-phosphoglyceride, 2-phosphoglyceride, phosphoenolpyruvic acid, pyruvic acid, acetyl-CoA, citric acid, cis-aconitic acid, isocitric acid, oxalosuccinic acid, 2-oxoglutaric acid, succinyl-CoA, succinic acid, fumaric acid, L-malic acid, and oxalacetic acid). They may be used alone or in combination with one another.

The fuel selected from any of glucose, ethanol, and intermediate product of glucose metabolism mentioned above may be incorporated into a system in which it is oxidized into $CO_2$ like methanol if it is combined with one or more adequate enzymes (particularly those involved in the TCA cycle) and the system is operated under optimal conditions. Glucose is particularly desirable because of its extremely easy handling properties.

The enzyme should be selected according to the fuel to be used. For example, the enzyme used for the fuel electrode includes glucose dehydrogenase, a series of enzymes involved in the electron transport system, ATP synthase, and any enzyme involved in glucose metabolism (such as hexokinase, glucose phosphate isomerase, phosphofructokinase, fructose diphosphate aldolase, triose phosphate isomerase, glyceryl aldehyde phosphate dehydrogenase, phosphoglyceromutase, phosphopyruvate hydratase, pyruvate kinase, L-lactate dehydrogenase, D-lactate dehydrogenase, pyruvate dehydrogenase, citrate synthase, aconitase, isocitrate dehydrogenase, 2-oxoglucolate dehydrogenase, succinyl-CoA synthase, succinate dehydrogenase, fumarase, and malonate dehydrogenase).

Figure 3:
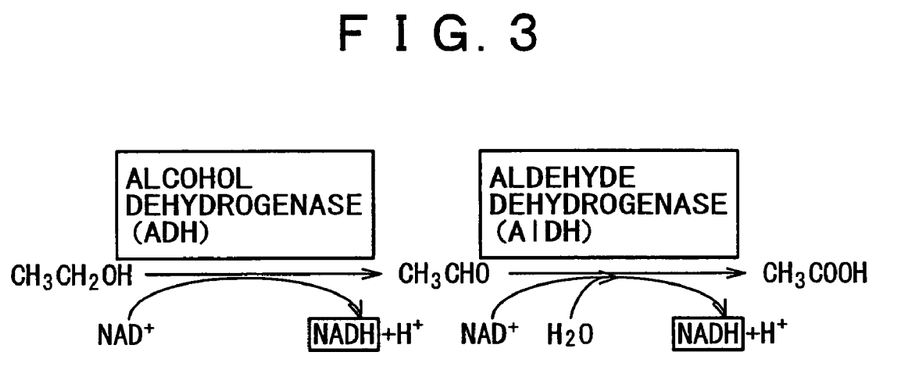
FIG. 3 is a diagram showing the complex enzymatic reaction that takes place when ethanol is used as fuel according to an embodiment of the present invention.

FIG. 3 is a diagram showing the complex enzyme reactions that take place when ethanol is used as the fuel. In the first stage, ethanol is oxidized into acetaldehyde by the action of alcohol dehydrogenase (ADH). In the second stage, acetaldehyde is oxidized into acetic acid by the action of aldehyde dehydrogenase (AlDH). In each stage, NAD+ (oxidized form) is reduced and NADH (reduced form) is formed. Electron transfer through the electron mediator takes place in the same way as methanol as shown in FIG. 2. It is assumed that the enzyme activities of ADH and AlDH are represented by U(ADH) and U(AlDH), respectively. Then the equation 0<U(ADH)≦U(AlDH) holds for U(ADH) corresponding to U(E1) and U(AlDH) corresponding to U(E2). In addition, the sum of U(ADH) and U(AlDH) is smaller than the enzyme activity U(DI) of DI, as represented by the equation U(ADH)+U(AlDH)≦U(DI).

Figure 4:
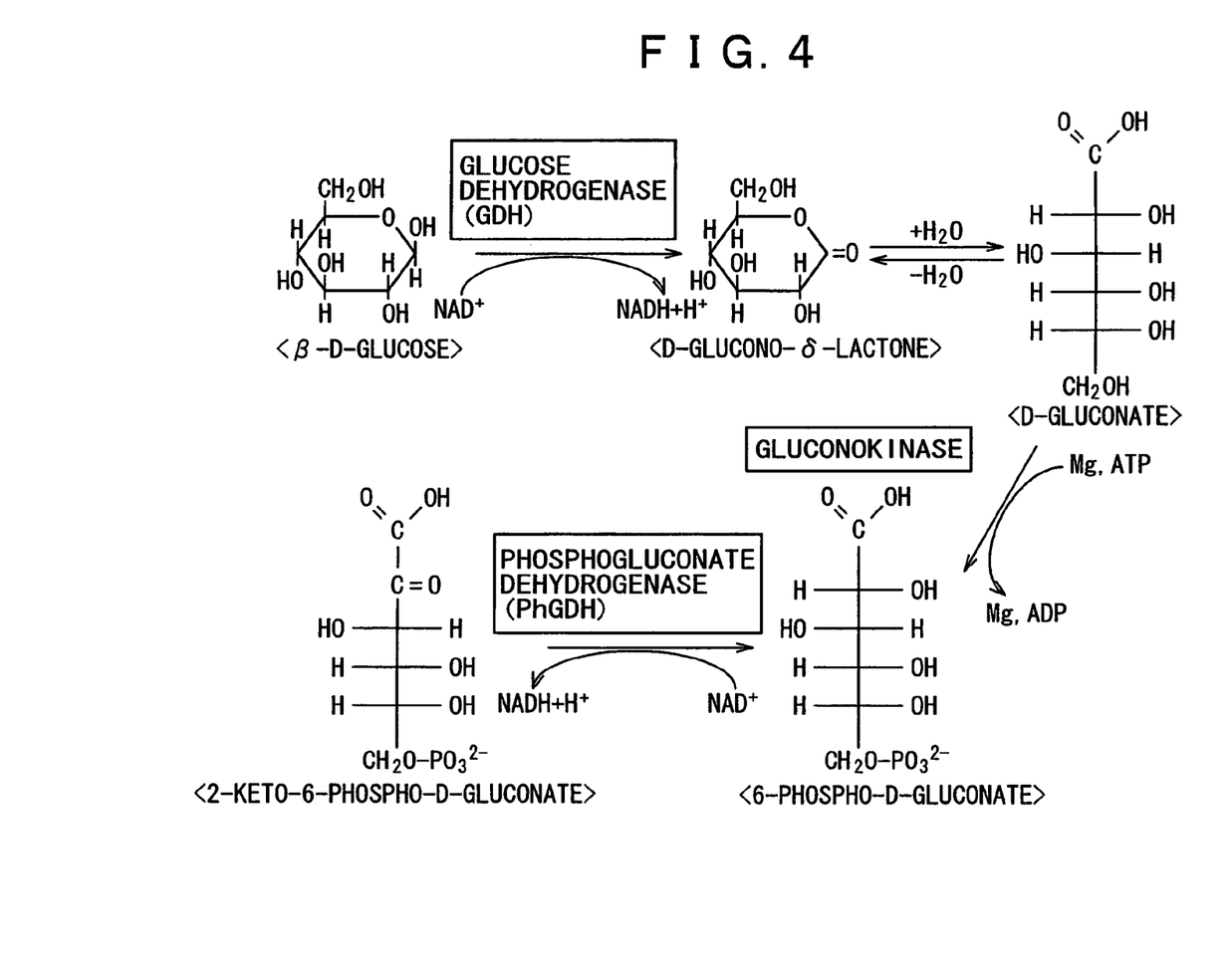
FIG. 4 is a diagram showing the enzymatic reaction that takes place when glucose is used as fuel according to an embodiment of the present invention.

FIG. 4 is a diagram showing the complex enzyme reactions that take place when glucose is used as the fuel. In the first stage for oxidation, β-D-glucose is decomposed into D-glucono-δ-lactone by the action of glucose dehydrogenase (GDH). Then, D-glucono-δ-lactone is hydrolyzed into D-gluconate. The D-gluconate is phosphorylated into 6-phospho-D-gluconate by hydrolysis of adenosine triphosphate (ATP) into adenosine diphosphate (ADT) in the presence of glucokinase. In the second stage for oxidation, the 6-phospho-D-gluconate is oxidized into 2-keto-6-phospho-D-gluconate by the action of phosphogluconate dehydrogenase (PhGDH). In each oxidation reaction, NAD+ (oxidized form) is reduced and NADH (reduced form) is formed. Electron transfer through the electron mediator takes place in the same way as methanol as shown in FIG. 2. It is assumed that the enzyme activities of GDH and PhDGH are represented by U(DGH) and U(PhGDH), respectively. Then the equation 0<U(DGH)≦U(PhGDH) holds for U(GDH) corresponding to U(E1) and U(PhDGH) corresponding to U(E2). In addition, the sum of U(GDH) and U(PhGDH) is smaller than the enzyme activity U(DI) of DI, as represented by the equation U(GDH)+U(PhGDH)≦U(DI).

One molecule of ethanol or glucose gives rise to two molecules of NADH; however, it is necessary to increase the energy density of fuel. To achieve the decomposition of glucose into $CO_2$, it is necessary to use glucose metabolism. It is necessary that the acetyl-CoA formed by acetaldehyde dehydrogenase (AalDH) should be transferred to the TCA cycle.

A fuel cell that uses glucose as fuel may run with the aid of glucose metabolism. The complex enzyme reaction based on glucose metabolism is divided broadly into two categories: glycolysis (decomposition of glucose and formation of pyruvic acid) and citric acid cycle. They are known well and hence their description is omitted here.

In the fuel cell in an embodiment of the present invention, the fuel electrode may be formed from carbon (glassy carbon), Pt, Au, or the like, and the air electrode may be formed from carbon-filled fluoroplastic which carries a catalyst such as Pt and the like. In addition, the air electrode may contain an oxidoreductase such as laccases, and the like. The proton conducting membrane should preferably be one such as "Nafion 117" (from DuPont) which is formed from fluoroplastic and other suitable proton conducting membranes.

As mentioned above, the fuel cell of the present invention in an embodiment is characterized in that the enzyme activity increases as the enzyme reaction proceeds stepwise, as specified by the equations (1) and (2) as above. The enzyme reaction in this way permits decomposition of fuel (e.g., methanol) into $CO_2$ and also permits rapid reactions to form NADH and $H^+$ and to decompose NADH. VK3 selected as the electron mediator accelerates the rate of migration of electrons from NADH to the fuel electrode. With the above-mentioned techniques used alone or in combination with one another, the fuel cell based on biogenic metabolism produces a high current density which has never been achieved. It is desirable to employ two techniques, so that a higher reaction rate and a higher current density are attained.

The fuel cell in an embodiment of the present invention utilizes the biogenic metabolism which is a highly efficient energy conversion system. Therefore, it is small in size and light in weight and yet it works stably at room temperature. Moreover, it permits easy fuel handling.

The enzymes used for cell reactions may be obtained in the usual way by extraction and purification from cultured cells and microbes which generate the desired enzymes. This helps reduce the production cost of the fuel cell.

To further illustrate the invention, and not by way of limitation, the following examples are given.

EXAMPLES

A series of experiments were carried out in the following examples to evaluate the fuel cell of the present invention in an embodiment. In the experiments, enzymes, coenzymes, electron mediators, and fuels are added little by little (of the order of microliters) so that the change in concentration and solution temperature is negligible after their addition.

Experiment 1

First, the rate at which NADH is formed was investigated to reveal the optimum enzyme activity of $NAD^+$-dependent dehydrogenase.

Example 1

A solution was made from 3 ml of 0.1 M tris buffer (pH 7.0, I.S.=0.3), 5 mM of $NAD^+$, and 1 M of methanol. The solution was purged with argon while stirring. The solution was incorporated with 25 units of ADH, 50 units of FalDH, and 75 units of FateDH. After the $NAD^+$-dependent dehydrogenase had been added to the solution, change in absorbance with time was measured by using an ultraviolet-visible spectrophotometer with an optical path length of 1 cm. The wavelength used for measurement was 340 nm which is specific for NADH. The concentration of generated NADH was determined from the change in absorbance. The temperature of the enzyme solution was kept at 40±1° C.

Example 2

The same procedure as in Example 1 was repeated to measure the concentration of NADH except that the solution of NAD$^+$-dependent dehydrogenase was formed from 25 units of ADH, 100 units of FalDH, and 200 units of FateDH.

Comparative Example 1

The same procedure as in Example 1 was repeated to measure the concentration of NADH except that the solution of NAD$^+$-dependent dehydrogenase was prepared from 25 units of ADH only, with FalDH and FateDH omitted.

Comparative Example 2

The same procedure as in Example 1 was repeated to measure the concentration of NADH except that the solution of NAD$^+$-dependent dehydrogenase was prepared from 25 units of ADH and 50 units of FalDH, with FateDH omitted.

Comparative Example 3

The same procedure as in Example 1 was repeated to measure the concentration of NADH except that the solution of NAD$^+$-dependent dehydrogenase was prepared from 25 units of ADH only, with FalDH and FateDH omitted, and the solution was incorporated with 50 units of FalDH 7.8 hours after the start of measurement and with 75 units of FateDH 9.0 hours after the start of measurement.

Comparative Example 4

The same procedure as in Example 1 was repeated to measure the concentration of NADH except that the solution of NAD$^+$-dependent dehydrogenase was prepared from 25 units of ADH, 20 units of FalDH, and 15 units of FateDH.

Figure 5:
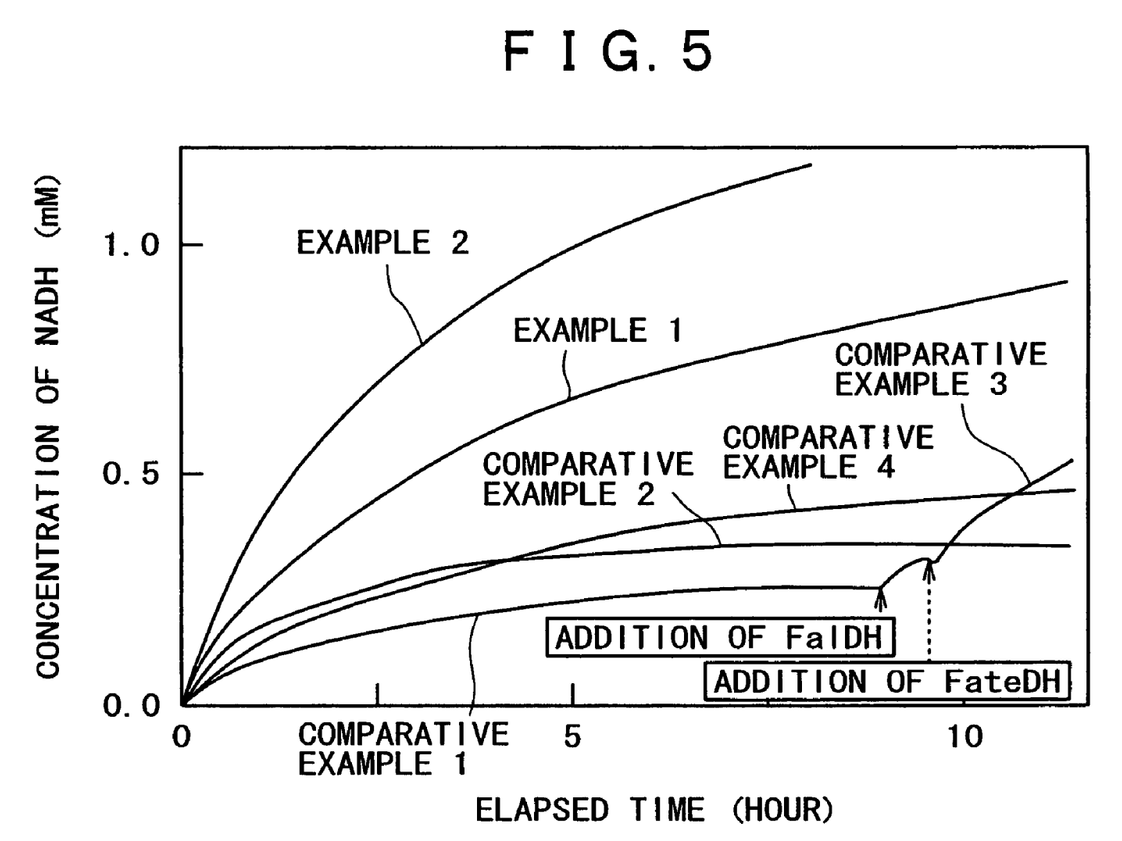
FIG. 5 is a graph which shows how the concentration of NADH changes with time in Experiment 1 according to an embodiment of the present invention.

FIG. 5 shows the change in NADH concentration with time which was measured in Examples 1 and 2 and Comparative Examples 1 to 4. Table 1 below shows the amount of NAD$^+$-dependent dehydrogenase added. The symbol (+) in the column of Comparative Example 3 denotes that the enzyme was not added at the start but was added in the course of measurement.

TABLE 1

|  | Example No. | | Comparative Example No. | | | |
| --- | --- | --- | --- | --- | --- | --- |
|  | 1 | 2 | 1 | 2 | 3 | 4 |
| ADH | 25 U | 25 U | 25 U | 25 U | 25 U | 25 U |
| FalDH | 50 U | 100 U | — | 50 U | (+) 50 U | 20 U |
| FateDH | 75 U | 200 U | — | — | (+) 75 U | 15 U |

It is noted from FIG. 5 that the concentration of NADH steadily increases with time in Example 1. By contrast, the rate of NADH formation is low in Comparative Examples 1 and 2 in which the NAD$^+$-dependent dehydrogenase is limited to one or two kinds.

The enzyme activity is increased in the sequence of ADH, FalDH, and FateDH, and the ratio of increase is larger in Example 2 than in Example 1. Therefore, the rate of NADH formation is greater in Example 2 than in Example 1.

By contrast, the formation of NADH reached the uppermost limit 7 hours after the start of measurement in Comparative Example 1 in which the solution of NAD$^+$-dependent dehydrogenase was prepared from ADH only. The rate of NADH formation is higher in Comparative Example 2 than in Comparative Example 1; however, the formation of NADH reaches the uppermost limit in Comparative Example 2 in which the solution of NAD$^+$-dependent dehydrogenase was prepared from ADH and FalDH. A probable reason for this is that incomplete decomposition products of methanol (such as formaldehyde and formic acid) accumulate in the enzyme solution and they alter pH and reduce the enzyme activity. Incidentally, although not shown in FIG. 5, the concentration of NADH did not increase remarkably 7.8 hours and onward after the start of measurement.

In Comparative Example 3, the rate of NADH formation was low as in Comparative Example 1 until FalDH was added but it steeply increased upon addition of FalDH and FateDH. A probable reason for this is that formaldehyde remains for a while after the start of measurement but it is decomposed into formic acid and CO$_2$ upon addition of FalDH and FateDH.

In Comparative Example 4, the enzyme solution contains three kinds of NAD$^+$-dependent dehydrogenase (ADH, FalDH, and FateDH) but their enzyme activity was sequentially decreased unlike that in Example 1. Therefore, the rate of NADH formation reached the uppermost limit. A probable reason for this is that the enzyme activity of FalDH and FateDH is lower than that of ADH and the decomposition of intermediate products (formaldehyde and formic acid) is retarded, which leads to phenomena similar to those in Comparative Examples 1 and 2.

The results of Experiment 1 suggest that it is necessary to rapidly decompose intermediate products which lower the enzyme activity when methanol is decomposed into CO$_2$. To achieve this, it is necessary to use three kinds of enzymes (ADH, FalDH, and FateDH) as NAD$^+$-dependent dehydrogenase in such a way that their enzyme activity sequentially increases in the order mentioned.

Experiment 2

This experiment was designed to find an adequate ratio of enzyme activities of NAD$^+$-dependent dehydrogenase and DI by measuring the open circuit voltage (OCV) of a three-electrode fuel cell. The three-electrode fuel cell has a working electrode of glassy carbon (3 mm in diameter), a counter electrode of Pt wire, and a reference electrode of Ag/AgCl. It was kept at 40±1° C.

Example 3

The enzyme solution prepared in Example 1 was incorporated with VK3 and 200 units of DI, and OCV was measured in the following manner.

A solution was made from 1 ml of tris buffer (pH 7.0, I.S.=0.3), 5 mM of VK3 (oxidized form), 5 mM of NAD$^+$, and 1 M of methanol. The solution was purged with argon while stirring. Incidentally, the concentration (5 mM) of VK3 is enough for the enzyme activity of DI. Then, the solution was incorporated with 25 units of ADH, 50 units of FalDH, and 75 units of FateDH. The OCV was measured. When the value of OCV became stable, the solution was incorporated with 200 units of DI. Starting at this point, the OCV was measured continuously.

Example 4

The same procedure as in Example 3 was repeated to measure the OCV except that the amount of DI was changed to 400 units.

Comparative Example 5

The same procedure as in Example 3 was repeated to measure the OCV except that the NAD$^+$-dependent enzyme was 25 units of ADH, with FalDH and FateDH omitted.

Comparative Example 6

The same procedure as in Example 3 was repeated to measure the OCV except that the NAD⁺-dependent enzyme was 25 units of ADH and 50 units of FalDH, with FateDH omitted.

Comparative Example 7

The same procedure as in Example 3 was repeated to measure the OCV except that the NAD⁺-dependent enzyme was 25 units of ADH, with FalDH and FateDH omitted, when OCV measurement started, 50 units of FalDH was added when 28.1 minutes elapsed after the start of OCV measurement, and 75 units of FateDH was added when 37.3 minutes elapsed after the start of OCV measurement.

Comparative Example 8

The same procedure as in Example 3 was repeated to measure the OCV except that the amount of DI was changed to 100 units.

Figure 6:
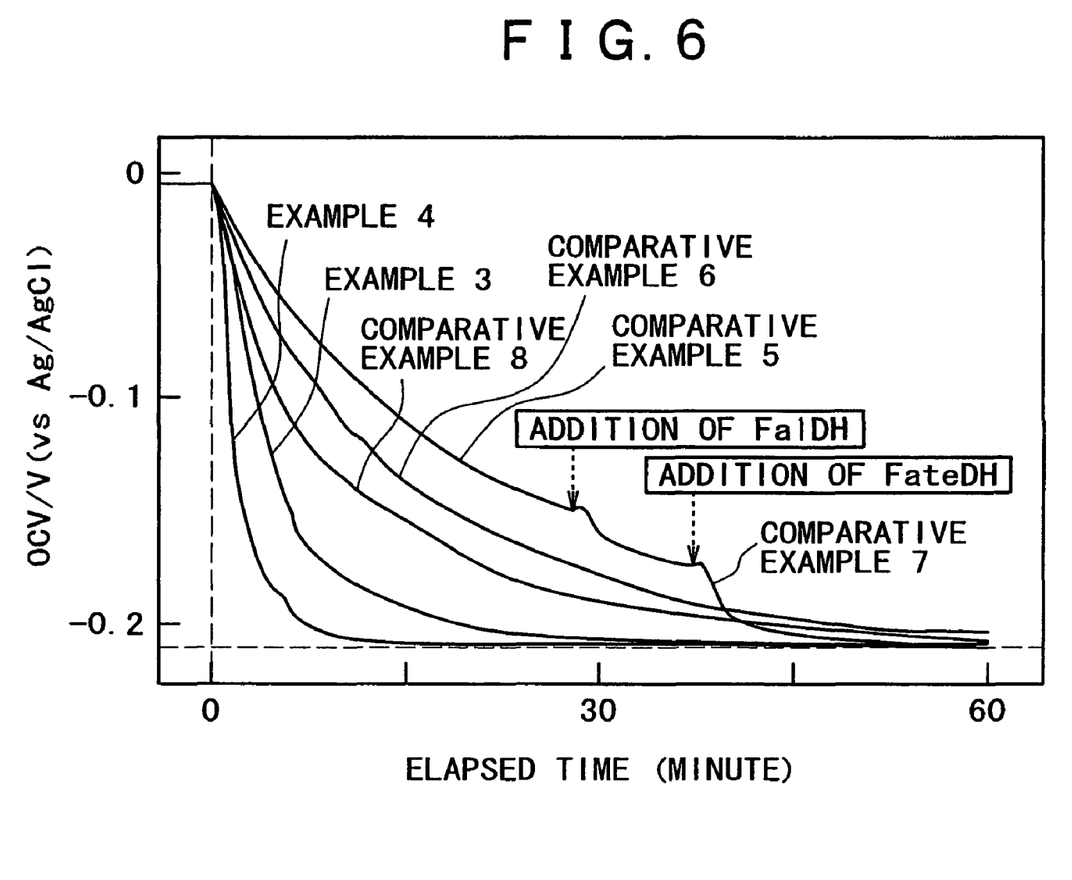
FIG. 6 is a graph which shows how OCV changes with time in Experiment 2 according to an embodiment of the present invention.

FIG. 6 shows the change in OCV with time which was measured in Examples 3 and 4 and Comparative Examples 5 to 8. Table 2 below shows the amount (enzyme activity) of NAD⁺-dependent dehydrogenase and DI used in Examples 3 and 4 and Comparative Examples 5 to 8. The symbol (+) in the column of Comparative Example 7 denotes that the enzyme was not added at the start of measurement but was added in the course of measurement.

TABLE 2

| | Example No. | | Comparative Example No. | | | |
|---|---|---|---|---|---|---|
| | 3 | 4 | 5 | 6 | 7 | 8 |
| ADH | 25 U | 25 U | 25 U | 25 U | 25 U | 25 U |
| FalDH | 50 U | 50 U | — | 50 U | (+) 50 U | 50 U |
| FateDH | 75 U | 75 U | — | — | (+) 75 U | 75 U |
| DI | 200 U | 400 U | 200 U | 200 U | 200 U | 100 U |

As shown in FIG. 6, it was observed in all the experiments that the enzymatic reaction proceeded after the start of OCV measurement, thereby forming the reduced form of VK3 and reducing the OCV. However, the rate at which OCV decreased varies depending on the magnitude of the enzyme activity of the enzyme added. For example, OCV in Example 3 decreased more rapidly than that in Comparative Examples 5 to 8 because DI existed sufficiently relative to NADH formed by NAD⁺-dependent dehydrogenase. The result was different in Example 4 in which the enzyme reaction of DI was much increased. That is, the transfer of electrons from NADH to VK3 accelerated and the OCV decreased rapidly to reach about −0.21 V (vs Ag/AgCl) which is the equilibrium redox potential of VK3. This suggests that in Examples 3 and 4, there existed sufficient DI for the amount of NADH produced.

By contrast, the result was different in Comparative Example 8 in which the enzyme activity of DI was insufficient for the rate at which NADH was produced. That is, the OCV decreasing rate was sufficiently high in the initial stage of measurement but it decreased gradually with time. A probable reason for this is that the enzymatic reaction of DI restricts the overall reaction rate, thereby increasing the amount of NADH.

The results in Comparative Examples 5 to 7 may be interpreted as follows. The enzyme activity of DI was sufficient but the enzyme activity of NAD⁺-dependent dehydrogenase was insufficient, and the NADH forming rate restricted the overall reaction rate, thereby reducing the OCV decreasing rate. In Comparative Example 5, the OCV did not decrease remarkably 28.1 minutes and onward after the start of measurement although this is not shown in FIG. 6.

The results of Experiment 2 mentioned above indicate that the sum of enzyme activities of NAD⁺-dependent dehydrogenase that forms NADH should be greater than the enzyme activity of DI that oxidizes NADH.

The fuel cell used in Experiment 2 is one which is provided with a fuel electrode (or working electrode) made of glassy carbon. However, it was confirmed that this fuel electrode may be replaced by a Pt electrode, Au electrode and the like.

The fuel cell used in Experiment 2 is that of three-electrode type. However, it was confirmed that the same result as mentioned above is produced even when the fuel cell is replaced by one which has a Pt catalyst as the air electrode and a Nafion membrane as the proton conducting membrane.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. A fuel cell comprising: an electrode; and an enzyme solution capable of decomposing a fuel with a plurality of enzymes in three or more stepwise reactions and transferring electrons produced by the oxidation reaction to the electrode, the enzyme solution including
   (a) fuel decomposing enzymes including a first enzyme, a second enzyme, and a third enzyme,
   (b) diaphorase, which oxidizes and decomposes NADH into NAD+ and H+, and
   (c) a NAD+ coenzyme,
   wherein the conditions specified by equations (1) and (2) below are satisfied and defined as follows:

$$0 < U(E1) \leq U(E2) \leq U(E3) \tag{1}$$

$$U(E1) + U(E2) + U(E3) \leq U(DI) \tag{2}$$

where U(E1) denotes an enzyme activity of the first enzyme, U(E2) denotes an enzyme activity of the second enzyme, U(E3) denotes an enzyme activity of the third enzyme, and U(DI) denotes an enzyme activity of the diaphorase.

2. The fuel cell as defined in claim 1, wherein the coenzyme transfers electrons further to an electron mediator.

3. The fuel cell as defined in claim 2, wherein the electron mediator is vitamin K3.

4. The fuel cell as defined in claim 1, wherein the fuel is at least one Species selected from the group consisting of alcohols, saccharides, fats, proteins, and organic acids.

5. The fuel cell as defined in claim 1, wherein the fuel is at least one species selected from the group consisting of methanol, ethanol, and glucose.

6. The fuel cell as defined in claim 1, wherein the fuel is methanol, the first enzyme is alcohol dehydrogenase, the second enzyme is formaldehyde dehydrogenase, and the third enzyme is formate dehydrogenase.

7. The fuel cell as defined in claim 1, wherein the fuel is ethanol, the first enzyme is alcohol dehydrogenase, the second enzyme is aldehyde dehydrogenase, and the third enzyme is formate dehydrogenase.

* * * * *